United States Patent [19]
Campbell et al.

[11] Patent Number: 4,787,482
[45] Date of Patent: Nov. 29, 1988

[54] SELF ENERGIZING DISC BRAKES

[75] Inventors: Roy Campbell, Worcestershire; Graham J. Gornall, West Midlands, both of England

[73] Assignee: Lucas Industries Public Limited Co., Birmingham, England

[21] Appl. No.: 618,419

[22] Filed: Jun. 7, 1984

[30] Foreign Application Priority Data

Jun. 11, 1983 [GB] United Kingdom ............... 8316026

[51] Int. Cl.⁴ .......................................... F16D 55/04
[52] U.S. Cl. ................................. 188/71.4; 188/71.6; 188/264 D
[58] Field of Search ............. 188/264 D, 264 E, 71.4, 188/71.5, 72.2, 71.6, 73.1, 73.2, 253, 261; 192/113 B, 70.12, 70.14

[56] References Cited

U.S. PATENT DOCUMENTS

| | | | |
|---|---|---|---|
| 1,286,171 | 11/1918 | Cory | 192/113 B |
| 1,700,860 | 2/1929 | Snell | 192/70.14 |
| 2,733,798 | 2/1956 | Almen et al. | 192/70.12 |
| 3,063,531 | 11/1962 | Aschauer | 188/264 E |
| 3,347,107 | 10/1967 | Flichy | 192/70.14 |
| 3,347,345 | 10/1967 | Rogers et al. | 188/264 E |
| 3,534,842 | 10/1970 | Davison | 192/113 B |
| 3,586,134 | 6/1971 | Westfall | 188/71.6 |
| 3,693,763 | 9/1972 | Powilleit | 188/72.7 |
| 3,842,948 | 10/1974 | Fredrick | 188/71.4 |
| 4,027,758 | 6/1977 | Gustavsson et al. | 188/264 E |

Primary Examiner—John W. Caldwell, Sr.
Assistant Examiner—Alvin Oberley
Attorney, Agent, or Firm—Oldham & Oldham, Co.

[57] ABSTRACT

A self-energizing disc brake of the spreading type is disclosed. In the disc brake rotatable friction discs provided on opposite sides with linings are adapted to be brought into engagement with radial braking surfaces in a housing by an actuator assembly. The actuator assembly comprises pressure plates located between the discs and centered by pilot lugs, and balls located in oppositely inclined recesses in the adjacent faces of the pressure plates. At least the linings which engage with the pressure plates are separated into annular rings by an annular groove, and the groove is substantially coincident with a pitch circle of constant diameter upon which the recesses lie in an angularly spaced relationship. The groove increases the degree of cooling in the regions of the base of the recesses, thereby reducing the likelihood of hot spotting occurring in such regions.

11 Claims, 5 Drawing Sheets

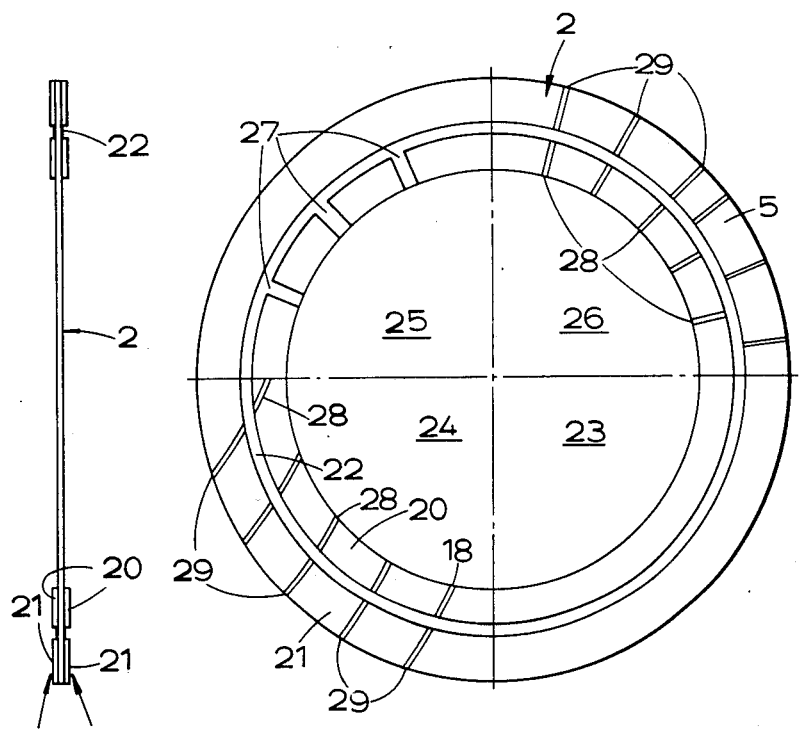
FIG.3
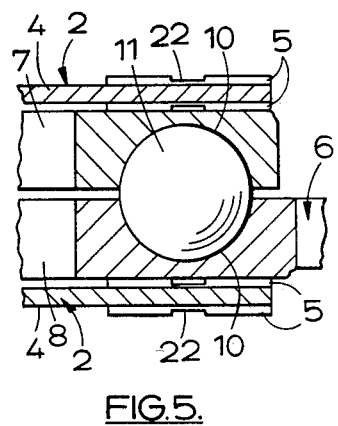
FIG.4.
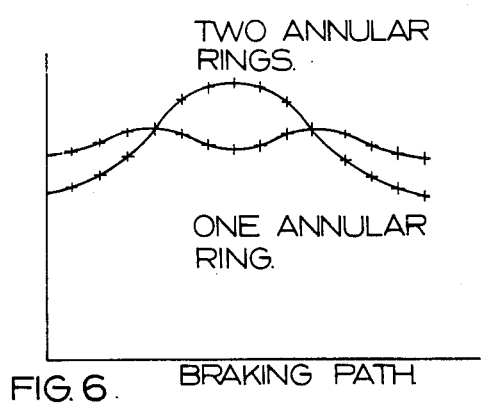
FIG.5.
FIG.6.

SELF ENERGIZING DISC BRAKES

This invention relates to self-energising disc brakes of the kind in which a rotatable friction disc provided with linings of friction material is adapted to be brought into engagement with a radial surface in a housing by means of a pressure plate centred by stationary pilot lugs in the housing, balls are located in co-operating oppositely inclined recesses in the adjacent faces of the pressure plates and a reaction member, and the application of the brake is initiated by moving the pressure plate angularly, the pressure plate then moving relatively axially into engagement with the friction disc which is thereby urged into engagement with the radial surface, and the pressure plate thereafter being carried round with the friction disc to provide a servo action.

Self-energising brakes of the kind set forth may be dry or they may be of the liquid cooled type, and such brakes are commonly used in tractors and like vehicles and are hereinafter called brakes of the kind set forth.

In known brakes of the kind set forth, hot or "blue" spotting can occur in the pressure plate in the thinner metal sections of the pressure plate at the bases of the recesses. Such hot or "blue" spotting can cause excessive wear and deterioration in the friction linings.

According to our invention in a disc brake of the kind set forth at least a lining of friction material of a friction disc which is adapted for engagement with a pressure plate is separated into annular rings by at least one annular groove, and the groove is substantially coincident with a pitch circle of constant diameter upon which the recesses in the pressure plates lie in an angularly spaced relationship.

The groove increases the degree of cooling in the regions of the thinner metal section at the base of the recesses for the balls, thereby reducing the likelihood of hot spotting occurring in such regions.

Conveniently superimposed annular grooves are provided in both linings on opposite sides of each friction disc, thereby increasing the cooling effect in the said regions of the recesses.

The linings may be constructed from any conventional organic or inorganic material. For example the linings may be constructed by powder, moulding or felting techniques. Typically powder is applied to sintered material, moulding to resin and fibre, and felting to paper. Conventional sintered material has a relatively low coefficient of friction ($\mu$) and is relatively noisy in operation, whereas organic material has a relatively high $\mu$ and is quieter in operation as compared with sintered material. The wear characteristics of organic material may not be as good as those of sintered material for a given area, at least when subjected to relatively high brake energy and power and such materials, when dry, can fatigue and de-laminate.

Some embodiments of our invention are illustrated in the accompanying drawings in which:

FIG. 3 is a plan of a rotatable braking member for the brake illustrated in FIGS. 1 and 2;

FIG. 4 is an end view of the same;

FIG. 5 is a section through an actuator for the brake;

FIG. 6 is a graph showing the relative cooling effects between a known friction member of an oil-immersed brake of the multi-plate type and a friction member of the present invention;

Figure 1:
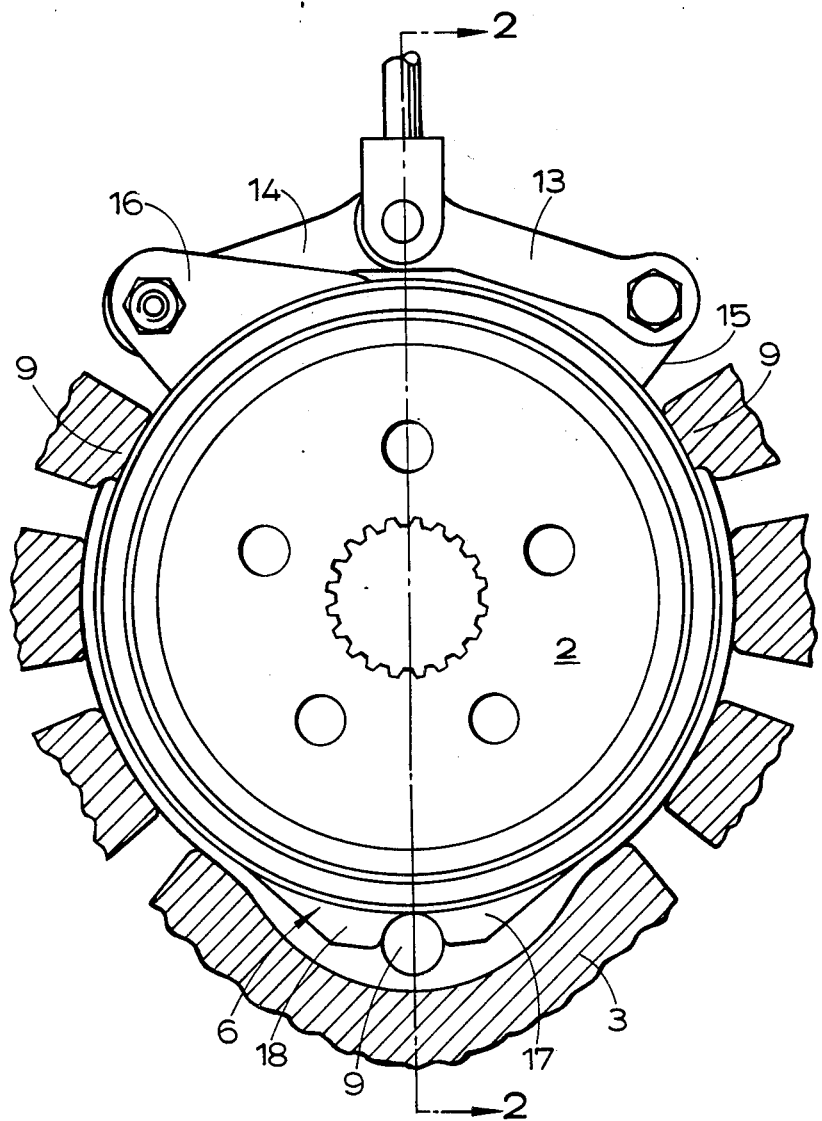
FIG. 1 is plan of a self-energising brake of the oil-immersed multi-plate type.
Figure 2:
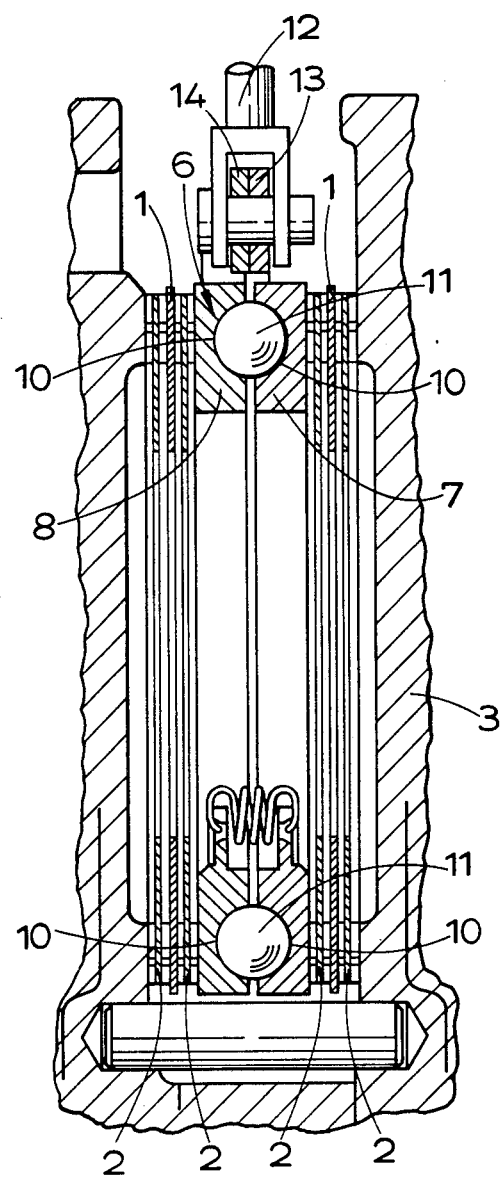
FIG. 2 is a section on the line 2—2 of FIG. 1.

An oil-immersed brake of the multi-plate type illustrated in FIGS. 1 to 5 of the accompanying drawings comprises sets of relatively stationary and rotatable friction braking members 1 and 2 which are alternatively interposed within a common housing 3 through which cooling oil is circulated. All the braking members 1, 2 comprise annular discs of which the stationary members 1 are keyed to the housing 3 at their outer peripheral edges for relative sliding movement, and the rotatable members 2 are slidably splined to a shaft to be braked. Each stationary member 1 comprises a planar steel plate which may be slotted to prevent coning, and each rotatable member 2 comprises a steel plate 4 provided on opposite sides with linings 5 of friction material.

An actuator assembly 6 is disposed between a pair of adjacent rotatable members 2, for example replacing a stationary plate. The actuator assembly 6 comprises a pair of pressure plates 7, 8 which are centered on pilots 9 in the housing 3 and are provided in adjacent faces with angularly spaced recesses 10 in complementary pairs of which balls 11 are housed.

A pull-rod 12 is coupled to the inner ends of a pair of toggle links 13, 14 of which the outer ends are coupled to respective radial lugs 15, 16 on the two pressure plates 7 and 8.

The application of the brake is initiated by the pull-rod 12 which withdraws the toggle links 13, 14 to move the pressure plates angularly in the housing 3 in opposite directions. This causes the pressure plates 7 and 8 to separate axially by the balls 11 running up ramps defined by the walls of the recesses 10. This tends to clamp the two sets of friction members 1, 2 together, and the engagement of the pressure plates 7, 8 with the rotatable members 2 causes the two pressure plates 7, 8 to be carried round with the members 2 until the movement of one of them is arrested by a stop abutment in the housing 3, suitably defined by the engagement of a lug 17, 18 on that plate with a respective pilot 9. The other plate continues to be carried round with a servo or self-energising action which increases the separation of the pressure plates 7, 8 to enhance the braking force.

Each lining 5 comprises a ring of friction material, for example of conventional sintered material, but preferably of an organic material, suitably paper or resin graphite. Each ring 5 is separated into inner and outer annular rings 20, 21 by means of superimposed circumferentially extending grooves 22, and the grooves 22 act as reservoirs for oil to ensure that the interengaging braking faces of stationary and rotatable friction members 1, 2 are adequately wetted, and therefore adequately cooled, when the brake is applied.

As illustrated each groove 22 is formed in the lining 5 itself but, in a modification, each groove 22 may define a space between two separate concentric rings of friction material.

The groove 22 is substantially coincident with the pitch circle diameter of the recesses 10 in which the balls 11 are located. This increases the degree of cooling in the regions of the thinner metal sections of the pressure plates 7 and 8, thereby reducing the likelihood of hot or "blue" spotting occuring in such regions.

The linings 5 are provided with means for replenishing the reservoirs and with throttling means to resist the centrifugal effect which might otherwise cause dissipation of the flow of liquid across the braking faces with inherent loss of cooling. Various arrangements of such replenishment and throttling means are illustrated in FIG. 3 of the drawings, with a different arrangement illustrated in each quadrant 23, 24, 25 and 26 of the friction member.

Depending upon the nature of the material comprising the friction lining and the effective area of the rings 20, 21, satisfactory replenishment of the reservoir and throttling can be achieved by the natural porosity of the material itself. This is illustrated in quadrant 23.

As shown in quadrant 25 the inner ring 20 may be provided with angularly spaced straight radial grooves 27 to ensure adequate replenishment of the reservoir, with throttling means for the outer ring 21 being defined by the porosity of the lining material.

In the construction shown in quadrant 26 both rings are provided with radial grooves 28 and 29 respectively which are substantially radial. The grooves 28 and 29 may be aligned at adjacent ends, or they may be relatively displaced circumferentially to increase the throttling effect. As illustrated, the grooves 28 and 29 may be straight but, in modifications, they may be eccentrically or spirally arranged.

As shown in quadrant 24 the grooves 28 and 29 are aligned at adjacent ends, but are curved slightly in the same direction to increase the rate of flow across the braking face.

In any of the constructions of quadrants 24, 25 and 26, the radial grooves may extend into the metal plate 4 itself. In another construction the grooves on opposite sides of the plate are superimposed upon each other, and may also be interconnected by complementary grooves extending through the metal plate 4 itself.

The graph of FIG. 6 compares the braking face temperature for a given area of friction lining between a lining comprising a conventional single annular ring, and that of the present invention comprising two or more annular rings separated by groove defining respective reservoirs for oil.

It will be observed that the braking face temperature of the conventional single ring rises significantly towards the centre of the face indicating inadequate liquid cooling. This will cause rapid wear of the lining material, for example fatigue and de-lamination in a construction in which the lining is of paper. In the construction of the present invention, incorporating at least two annular rings, it will be seen that a more even braking face temperature is achieved across the whole of the face indicating adequate and more even cooling.

Figure 7:
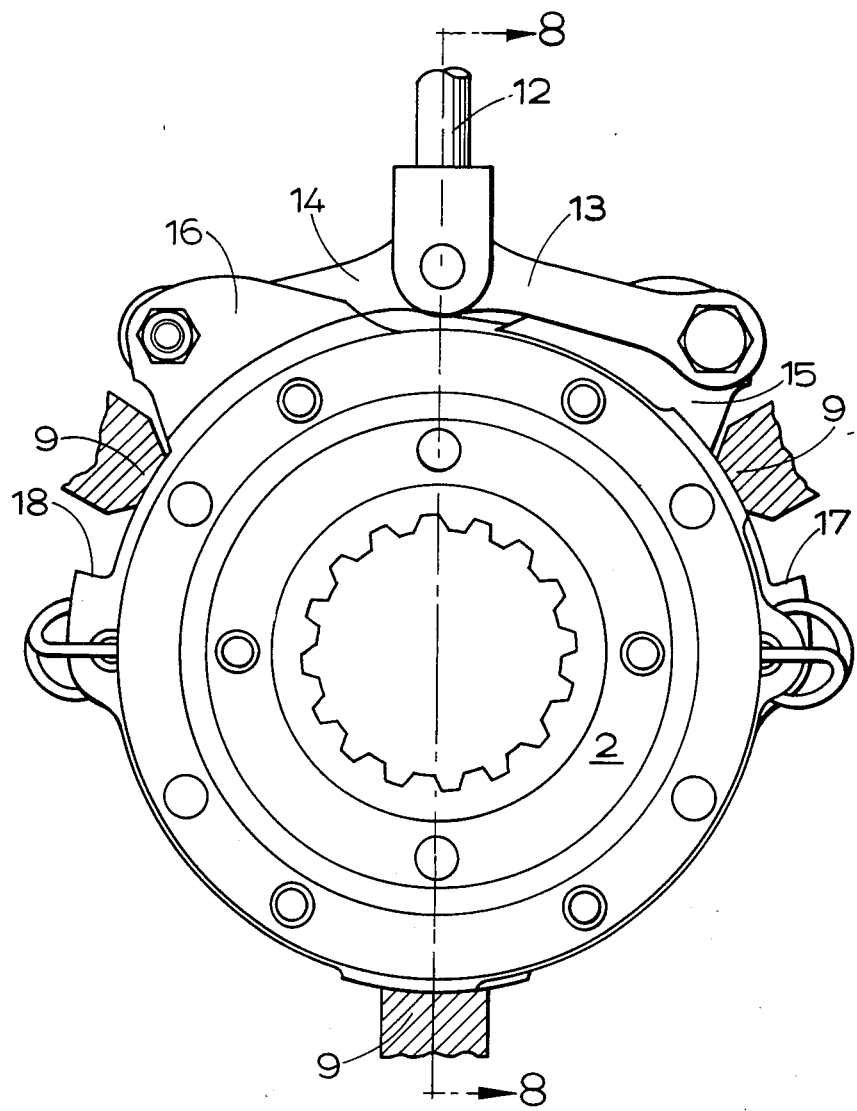
FIG. 7 is plan of a self-energising brake of the dry-type.
Figure 8:
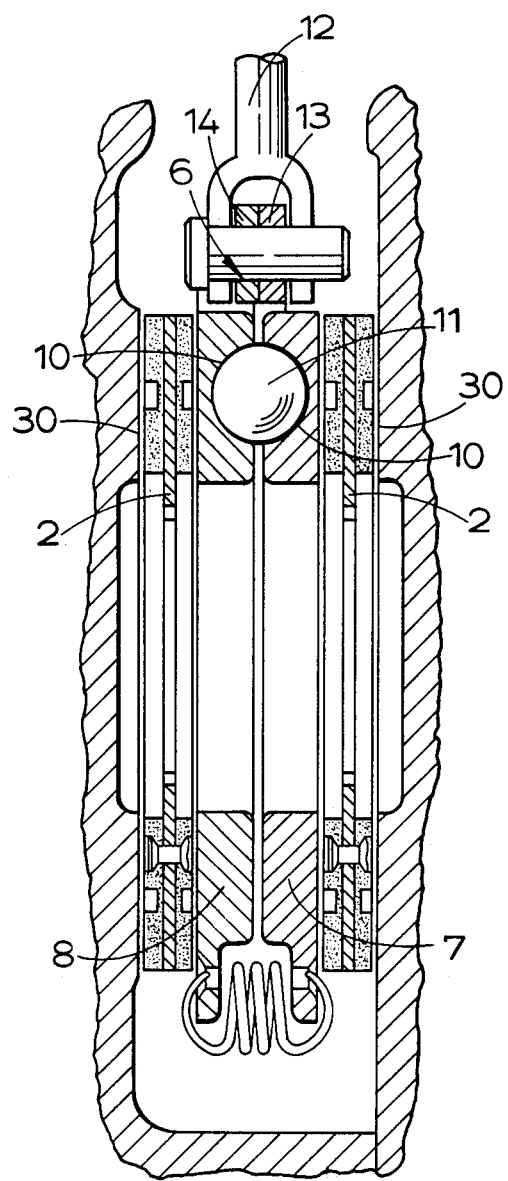
FIG. 8 is a section on the line 8—8 of FIG. 7.

In another construction illustrated in FIGS. 7 and 8 at the drawings the brake is of the "dry type". The intermediate stationary members 1 are omitted and a pair of rotatable members 2 are clamped against internal radial surfaces 30 at opposite ends of the housing 3 by the actuator assembly 6 when the brake is applied. The radial grooves 27, 28 and 29 may be omitted to leave the two rings 20 and 21 with continuous braking faces, for example as shown in quadrant 23 of FIG. 3.

The construction and operation of the brake of FIGS. 7 and 8 is otherwise the same as that of FIGS. 1 to 5, and corresponding reference numerals have been applied to corresponding parts.

We claim:

1. A self-energising disc brake comprising a housing, axially spaced first and second surfaces in said housing, radial pilot lugs in said housing, axially spaced first and second pressure plates centred on said pilot lugs, adjacent faces of said pressure plates, being provided with cooperating oppositely inclined angularly spaced recesses defined between end faces, balls located in complementary pairs of said recesses, said recesses having an angularly spaced relationship relative to each other to form a pitch circle of constant diameter, a first unitary rotatable friction member disposed between said first pressure plate and said first surface, a second unitary rotatable friction member disposed between said second pressure plate and said second surface, each of said friction members comprising a disc, and first and second linigs of friction material for engagement with the adjacent pressure plate and the adjacent surface, respectively, carried by opposite faces of said disc, and means for moving said pressure plates angularly relative to said housing to initiate application of said brake with said pressure plates also moving axially to urge the friction members into engagement with said first and second surfaces, respectively, due to a tendency for said balls to ride up said end faces, said pressure plates thereafter being carried round with said friction member to provide a servo action, wherein a braking face of at least said first lining of friction material of each of said friction members is separated into only two annular rings by only a single annular groove, and said groove is substantially coincident with said pitch circle of constant diameter to increase the degree of cooling in said recesses.

2. A disc brake as claimed in claim 1, wherein a single superimposed annular groove is provided in both said first and second linings on opposite sides of each of said discs.

3. A disc brake as claimed in claim 1, wherein said first and second discs comprise metal plates, and each said lining is secured to a respective side of a respective one of said metal plates, and each said groove being formed in the lining itself.

4. A disc brake as claimed in claim 1, wherein said first and second discs comprise metal plates, and each lining is secured to a respective side of a respective metal plate, and each groove defines a space between two separate concentric rings of friction material.

5. A disc brake as claimed in claim 1, wherein said the brake is of the liquid cooled type and each of said grooves acts as a reservoir for liquid, each of said first linings being provided with means for replenishing said reservoir and with throttling means to resist the centrifugal effect tending to cause dissipation of the flow of liquid across a said braking face.

6. A disc brake as claimed in claim 1, wherein said the brake is of the liquid cooled type and said grooves act as a reservoir for liquid, replenishment of the reservoir and throttling of the liquid to resist the centrifugal effect tending to cause dissipation of the flow of liquid accross a said braking face are achieved by the natural porosity of the lining material.

7. A disc brake as claimed in claim 5, in which replenishment is achieved by the provision of radial grooves in said ring which is innermost, and throttling by the porosity of the material of said ring which is outermost.

8. A disc brake as claimed in claim 5, wherein both said rings are provided with radial grooves to achieve replenishment.

9. A disc brake as claimed in claim 8, in which the inner ends of said radial grooves are relatively displaced circumferentially to increase throttling.

10. A disc brake as claimed in claim 1, wherein said brake is of the dry type, and a single friction member is disposed between said pressure plates and each of said first and second surfaces in said housing.

11. A disc brake as claimed in claim 1 wherein said brake is of the liquid cooled type and said groove acts as a reservoir for liquid, thereby increasing the degree of cooling in said recesses.

* * * * *